US012729163B2

(12) United States Patent
Lee et al.

(10) Patent No.: US 12,729,163 B2
(45) Date of Patent: Sep. 8, 2026

(54) PLASMA-RESISTANT CERAMIC SUBSTRATE AND METHOD OF MANUFACTURING THE SAME

(71) Applicant: KOREA INSTITUTE OF CERAMIC ENGINEERING AND TECHNOLOGY, Jinju-si (KR)

(72) Inventors: Sung Min Lee, Seoul (KR); Yoon Suk Oh, Seoul (KR); Hyeong Jun Kim, Cheonan-si (KR); Gyusang Oh, Geoje-si (KR)

(73) Assignee: KOREA INSTITUTE OF CERAMIC ENGINEERING AND TECHNOLOGY, Jinju-si (KR)

( * ) Notice: Subject to any disclaimer, the term of this patent is extended or adjusted under 35 U.S.C. 154(b) by 576 days.

(21) Appl. No.: 18/268,879

(22) PCT Filed: Dec. 2, 2021

(86) PCT No.: PCT/KR2021/018165
§ 371 (c)(1),
(2) Date: Jun. 21, 2023

(87) PCT Pub. No.: WO2022/139240
PCT Pub. Date: Jun. 30, 2022

(65) Prior Publication Data

US 2024/0043338 A1 Feb. 8, 2024

(30) Foreign Application Priority Data

Dec. 22, 2020 (KR) ........................ 10 2020-0180432

(51) Int. Cl.
*C04B 35/44* (2006.01)
*C04B 35/48* (2006.01)
*C04B 41/81* (2006.01)

(52) U.S. Cl.
CPC .............. *C04B 35/44* (2013.01); *C04B 35/48* (2013.01); *C04B 41/81* (2013.01); *C04B 2235/963* (2013.01)

(58) Field of Classification Search
CPC . C04B 41/5011; C04B 41/5012; C04B 41/81; C04B 41/009; C04B 41/4529; C04B 41/48
See application file for complete search history.

(56) References Cited

U.S. PATENT DOCUMENTS 10,443,125 B2 * 10/2019 Wu ........................... C23C 4/11
2018/0327898 A1 * 11/2018 Wu ........................ C23C 16/28

FOREIGN PATENT DOCUMENTS

EP 1847628 A1 * 10/2007 ............... C23C 4/08
JP 2020080412 A 5/2020

(Continued)

OTHER PUBLICATIONS

International search report of PCT/KR2021/018165, Mar. 15, 2022, English translation.

(Continued)

*Primary Examiner* — Noah S Wiese
(74) *Attorney, Agent, or Firm* — Hauptman Ham, LLP

(57) ABSTRACT

The present invention provides a plasma-resistant ceramic substrate including a bulk of an oxide composition; and a surface layer in which an oxide composition component constituting the bulk was modified to a composition including one or more anions selected from the group consisting of $F^-$ and $Cl^-$, wherein the surface layer is a layer in which a raw material containing one or more anions selected from the group consisting of $F^-$ and $Cl^-$ is vaporized by heating and adsorbed on the surface of the ceramic substrate to be modified to a composition including one or more anions selected from the group consisting of $F^-$ and $Cl^-$, and a method of manufacturing the same. According to the present (Continued)

invention, the plasma resistance and durability of the ceramic substrate can be improved at low cost.

15 Claims, 5 Drawing Sheets

(56) References Cited

FOREIGN PATENT DOCUMENTS

| | | | |
|---|---|---|---|
| KR | 20050047698 | A | 5/2005 |
| KR | 20110118939 | A | 11/2011 |
| KR | 20150092227 | A | 8/2015 |
| KR | 20200090180 | A | 7/2020 |

OTHER PUBLICATIONS

Je-Boem Song et al, Contamination Particle Behavior of Aerosol Deposited Y2O3 and YF3 Coatings under NF3 Plasma, Coatings, May 9, 2019, vol. 9, No. 5, pp. 1-10, MDPI, Basel, Switzerland, pp. 1-6; figure 5(a).

* cited by examiner

PLASMA-RESISTANT CERAMIC SUBSTRATE AND METHOD OF MANUFACTURING THE SAME

CROSS-REFERENCE TO RELATED APPLICATIONS

This application is the U.S. National Phase under 35 U.S.C. § 371 of International Application No. PCT/KR2021/018165, filed on Dec. 2, 2021, which in turn claims the benefit of Korean Application No. 10-2020-0180432, filed on Dec. 22, 2020, the disclosures of which are incorporated by reference into the present application.

TECHNICAL FIELD

The present invention relates to a plasma-resistant ceramic substrate and a method of manufacturing the same, and more particularly, to a plasma-resistant ceramic substrate in which plasma resistance and durability can be improved by modifying an oxide composition component constituting the bulk to a composition including one or more anions selected from the group consisting of $F^-$ and $Cl^-$ using raw materials containing F, Cl, etc. and low-cost heat treatment technology, and a method of manufacturing the same.

BACKGROUND ART

A plasma process not only promotes a chemical reaction with a material by generating radicals with high chemical activity, but also promotes the reaction as cations dissociated by plasma are incident on a surface of the material with high energy, and causes physical etching of the material. A typical material with excellent plasma resistance is $Al_2O_3$, and recently, yttrium oxide ($Y_2O_3$), yttria-stabilized zirconia (YSZ) and the like, which have more excellent plasma resistance, have been adopted and widely used.

When a ceramic substrate material, such as $Y_2O_3$, yttria-stabilized zirconia (YSZ), zirconia doped with one or more elements selected from the group consisting of rare earth elements, Ca, and Mg, is used as a component of semiconductor manufacturing equipment, it is exposed to a plasma process environment including elements (F, Cl, etc.) that cause chemical deterioration of the ceramic substrate. As such, when the ceramic substrate is deteriorated by exposure to the plasma process environment, it appears in the form of contamination (particle type, reactant type) during the semiconductor manufacturing process, and provides a cause for lowering the wafer production yield. In addition, it causes an increase in the cost of post-processing for component recycling such as a cleaning process.

For example, when $Y_2O_3$ is exposed to plasma, contaminant particles including fluorine are formed, and when $Y_2O_3$ is subjected to a thermal cycle, stress is generated due to the difference in thermal expansion coefficient between the contaminant particles and $Y_2O_3$, and there is a problem in that the contaminant particles are released. The released contaminant particles cause a problem in that the yield of the product is lowered, thereby reducing the yield of wafer production. To solve this problem, a method of forming an $YO_xF_y$ coating layer using a plasma spraying method has been used. In order to form a coating layer including fluorine by the plasma spraying method, a complex and expensive method of several steps is required. First, a process of synthesizing a raw material including F, a process of manufacturing spherical granule powder of 10 to 50 μm through a process of spheroidizing the synthesized raw material, and a process of coating the spherical powder through a plasma sprayer are required. The coating layer produced through this process not only requires expensive production costs, but also uses high-temperature plasma, so that there is a disadvantage in that the coating layer is oxidized, fluorine is volatilized, and the density of the coating layer is lowered and the generation of contaminant particles cannot be sufficiently suppressed. There is a problem in that a process of preparing a substrate as a base material for coating is required, an additional complicated coating process is required, and deterioration of the coating layer inevitably occurs. Therefore, there is a need to overcome the limitations of existing processes required to manufacture a coating layer including such fluorine or chlorine.

RELATED ART DOCUMENT

Patent Document

Korean Patent Publication No. 10-2005-0047698

DISCLOSURE

Technical Problem

The problem to be solved by the present invention is to provide a plasma-resistant ceramic substrate in which plasma resistance and durability can be improved by modifying an oxide composition component constituting the bulk to a composition including one or more anions selected from the group consisting of $F^-$ and $Cl^-$ using raw materials containing F, Cl, etc. and low-cost heat treatment technology, and a method of manufacturing the same.

Technical Solution

The present invention provides a plasma-resistant ceramic substrate including: a bulk of an oxide composition; and a surface layer in which an oxide composition component constituting the bulk was modified to a composition including one or more anions selected from the group consisting of $F^-$ and $Cl^-$, wherein the surface layer is a layer in which a raw material containing one or more anions selected from the group consisting of $F^-$ and $Cl^-$ is vaporized by heating and adsorbed on a surface of a ceramic substrate to be modified to a composition including one or more anions selected from the group consisting of $F^-$ and $Cl^-$.

The bulk of the ceramic substrate may be made of $Y_2O_3$, $Y_3Al_5O_{12}$, yttria-stabilized zirconia or a zirconia material doped with one or more elements selected from the group consisting of rare earth elements, Ca and Mg.

The surface layer may have a thickness of 100 nm to 50 μm.

The raw material may include one or more solid materials selected from the group consisting of $NH_4F$, $NH_5F_2$, LiF, NaF, KF, $MgF_2$, $CaF_2$, $AlF_3$, and $YF_3$.

The raw material may include one or more solid materials selected from the group consisting of $NH_4Cl$, $YCl_3$, $AlCl_3$, and $TaCl_3$.

The raw material may be a solid material that is a mixture of one or more materials selected from the group consisting of $NH_4F$, $NH_5F_2$, LiF, NaF, KF, $MgF_2$, $CaF_2$, $AlF_3$, and $YF_3$ and one or more materials selected from the group consisting of $NH_4Cl$, $YCl_3$, $AlCl_3$, and $TaCl_3$.

A non-reactive solid diluent may be further mixed with the raw material and heated together with the raw material, and an amount of the raw material vaporized by heating may be controlled by the non-reactive solid diluent.

An inert carrier gas may be introduced while the vaporized raw material moves to the ceramic substrate to control a concentration of the vaporized raw material or to control an atmosphere for surface modification.

Air or oxygen ($O_2$) gas may be introduced to control an oxygen content of the surface layer to be modified while the vaporized raw material moves to the ceramic substrate.

The ceramic substrate to be surface-modified, and the raw material containing one or more anions selected from the group consisting of $F^-$ and $Cl^-$ may be heated, and the surface layer in which the surface of the ceramic substrate is modified to the composition including one or more anions selected from the group consisting of $F^-$ and $Cl^-$ may be formed while the raw material vaporized by heating is adsorbed on a surface of the heated ceramic substrate.

The surface layer may be formed by heating and vaporizing the raw material at a temperature of 80 to 500° C. and adsorbing the vaporized raw material on the surface of the ceramic substrate.

In addition, the present invention provides a method of manufacturing a plasma-resistant substrate including (a) heating and vaporizing a raw material containing one or more anions selected from the group consisting of $F^-$ and $Cl^-$ and (b) forming a surface layer by adsorbing the vaporized raw material on a surface of a ceramic substrate and modifying the surface of the ceramic substrate, wherein the surface layer is a layer in which an oxide composition component constituting the bulk was modified to a composition including one or more anions selected from the group consisting of $F^-$ and $Cl^-$.

The bulk of the ceramic substrate may be made of $Y_2O_3$, $Y_3Al_5O_{12}$, yttria-stabilized zirconia or a zirconia material doped with one or more elements selected from the group consisting of rare earth elements, Ca and Mg.

The surface layer may be formed to a thickness of 100 nm to 50 μm.

The raw material may include one or more solid materials selected from the group consisting of $NH_4F$, $NH_5F_2$, LiF, NaF, KF, $MgF_2$, $CaF_2$, $AlF_3$, and $YF_3$.

The raw material may include one or more solid materials selected from the group consisting of $NH_4Cl$, $YCl_3$, $AlCl_3$, and $TaCl_3$.

The raw material may be a solid material that is a mixture of one or more materials selected from the group consisting of $NH_4F$, $NH_5F_2$, LiF, NaF, KF, $MgF_2$, $CaF_2$, $AlF_3$, and $YF_3$ and one or more materials selected from the group consisting of $NH_4Cl$, $YCl_3$, $AlCl_3$, and $TaCl_3$.

A non-reactive solid diluent may be further mixed with the raw material and heated together with the raw material, and an amount of the raw material vaporized by heating may be controlled by the non-reactive solid diluent.

An inert carrier gas may be introduced while the vaporized raw material moves to the ceramic substrate to control a concentration of the vaporized raw material or to control an atmosphere for surface modification.

Air or oxygen ($O_2$) gas may be introduced to control an oxygen content of the surface layer to be modified while the vaporized raw material moves to the ceramic substrate.

The ceramic substrate to be surface-modified, and the raw material containing one or more anions selected from the group consisting of $F^-$ and $Cl^-$ may be heated, and the surface of the ceramic substrate may be modified to the composition including one or more anions selected from the group consisting of $F^-$ and $Cl^-$ while the raw material vaporized by heating is adsorbed on a surface of the heated ceramic substrate.

The raw material may be heated to a temperature of 80 to 500° C. and vaporized and adsorbed on the surface of the ceramic substrate.

Step (a) may include (c) putting the ceramic substrate to be surface-modified and the raw material containing one or more anions selected from the group consisting of $F^-$ and $Cl^-$ into a crucible, (d) charging the crucible accommodating the ceramic substrate and the raw material into a chamber provided to control an internal temperature through a heating means, and (e) heating and vaporizing the raw material through the heating means.

In step (c), the ceramic substrate and the raw material may be put in the crucible so as to be positioned in spaces separated from each other.

The ceramic substrate may be positioned higher than the raw material.

A support higher than a bottom surface of the crucible and smaller than an inner diameter of the crucible may be provided in the crucible, the raw material may be positioned on the bottom surface of the crucible, and the ceramic substrate may be seated on the support to be positioned higher than the raw material so that the raw material and the ceramic substrate are spatially separated.

Step (a) may include placing the ceramic substrate to be surface-modified in a furnace, putting the raw material for surface modification in a crucible and positioning the raw material for surface modification in the furnace to be spaced apart from the ceramic substrate to be surface-modified, and heating and vaporizing the raw material using a heating means, wherein in the furnace, a heating temperature for the ceramic substrate and a heating temperature for the raw material may be set to be different from each other.

The heating temperature of the raw material may be set lower than the heating temperature of the ceramic substrate.

The ceramic substrate and the raw material may be heated by the heating means, and a carrier gas may flow therethrough, so that the vaporized raw material may be moved toward the ceramic substrate and adsorbed on the surface of the ceramic substrate.

Step (a) may include placing the ceramic substrate to be surface-modified in a first furnace, putting the raw material for surface modification in a crucible and placing the material in a second furnace, heating the ceramic substrate through a first heating means, and heating and vaporizing the raw material through a second heating means, wherein a heating temperature for the ceramic substrate and a heating temperature for the raw material may be set to be different from each other.

The heating temperature of the raw material may be set lower than the heating temperature of the ceramic substrate.

The ceramic substrate may be heated by the first heating means, the raw material may be heated by the second heating means, and a carrier gas may be supplied to a second furnace so that the vaporized raw material is introduced into the first furnace, the vaporized raw material introduced into the first furnace may be moved toward the ceramic substrate and adsorbed on the surface of the ceramic substrate.

Advantageous Effects

According to the present invention, plasma resistance and durability can be enhanced through surface modification of ceramic oxide parts used in semiconductor chip production process equipment (etching, CVD coating, and the like). It is possible to improve the plasma resistance and durability of ceramic substrates, which are actively used industrially such as yttria ($Y_2O_3$), at a low cost.

Conventionally, in order to obtain a composition including fluorine to improve plasma resistance, a process of synthesizing solid raw materials including fluorine first, a process of spheroidizing the synthesized raw material into spherical granules of 10 to 50 μm, and a coating process using expensive equipment such as plasma spraying need to be used. In this case, in addition to including a process of synthesizing and spheroidizing solid raw materials including expensive fluorine in advance, there is a disadvantage in that fluorine is volatilized or oxidized by high heat generated during the plasma spraying process, so that the coating is not made with a desired composition. In addition, when manufacturing a plasma-resistant member coated with a composition including fluorine by a conventional method, in order to obtain the desired exact shape and size, a process of manufacturing a separate substrate whose size and shape are precisely controlled needs to be performed in advance, taking into account the expected thickness of the coating, which varies from 0.03 to 0.2 mm depending on the position of the member, and a process of additionally precisely coating the substrate is included, and thus there is a disadvantage in that production costs are very high. In addition, when a shape of the substrate, which is a base material of coating, has an internal structure such as a hole or a curved shape, it is impossible to uniformly coat all surfaces of the substrate with conventional coating methods. As conventional coating methods, methods such as PVD as well as plasma spraying have the same limitations. According to the present invention, complex process procedures such as a separate coating raw material synthesis process, a spheroidization process, and a plasma spraying process are not required, in particular, it is not necessary to separately configure the manufacturing and coating process of a substrate that is a base material of the coating, and the surface can be changed to a composition including fluorine or chlorine through a simple surface modification process using a final product as a substrate without being constrained by a geometric shape of the substrate.

According to the present invention, even when exposed to a fluorine or chlorine-based plasma process environment, the ceramic substrate can be suppressed from being deteriorated, and accordingly, contamination during the semiconductor manufacturing process can be suppressed, wafer production yield can be improved, and post-process costs for part reproduction, such as a cleaning process, can be reduced.

MODES OF THE INVENTION

Figure 1:
FIG. 1 is a view showing a plasma-resistant ceramic substrate according to an exemplary embodiment of the present invention.

Hereinafter, embodiments of the present invention will be described in detail with reference to the accompanying drawings. However, the following examples are provided so that those of ordinary skill in the art can fully understand the present invention, and can be modified to various other forms, and the scope of the present invention is not limited to the examples described below.

When it is said that any one component "include(s)" another component in the detailed description or claims of the invention, this should not be construed as being limited to being made up of only the component, unless otherwise stated, and it should be understood that other components may be further included.

Hereinafter, 'bulk' is used as a part constituting the inside of a surface-modified ceramic substrate, excluding the surface layer.

A plasma-resistant ceramic substrate according to an exemplary embodiment of the present invention includes a bulk of an oxide composition; and a surface layer in which an oxide composition component constituting the bulk was modified to a composition including one or more anions selected from the group consisting of $F^-$ and $Cl^-$, wherein the surface layer is a layer in which a raw material containing one or more anions selected from the group consisting of $F^-$ and $Cl^-$ is vaporized by heating and adsorbed on a surface of a ceramic substrate to be modified to a composition including one or more anions selected from the group consisting of $F^-$ and $Cl^-$.

The bulk of the ceramic substrate may be made of $Y_2O_3$, $Y_3Al_5O_{12}$, yttria-stabilized zirconia or a zirconia material doped with one or more elements selected from the group consisting of rare earth elements, Ca and Mg.

The surface layer preferably has a thickness of 100 nm to 50 μm.

The raw material may include one or more solid materials selected from the group consisting of $NH_4F$, $NH_5F_2$, LiF, NaF, KF, $MgF_2$, $CaF_2$, $AlF_3$, and $YF_3$.

The raw material may include one or more solid materials selected from the group consisting of $NH_4Cl$, $YCl_3$, $AlCl_3$, and $TaCl_3$.

The raw material may be a solid material that is a mixture of one or more materials selected from the group consisting of $NH_4F$, $NH_5F_2$, LiF, NaF, KF, $MgF_2$, $CaF_2$, $AlF_3$, and $YF_3$ and one or more materials selected from the group consisting of $NH_4Cl$, $YCl_3$, $AlCl_3$, and $TaCl_3$.

A non-reactive solid diluent may be further mixed with the raw material and heated together with the raw material, and the amount of the raw material vaporized by heating may be controlled by the non-reactive solid diluent.

An inert carrier gas may be introduced while the vaporized raw material moves to the ceramic substrate to control a concentration of the vaporized raw material or an atmosphere for surface modification.

Air or oxygen ($O_2$) gas may be introduced while the vaporized raw material moves to the ceramic substrate, and thus the oxygen content of the surface layer to be modified may be controlled.

The ceramic substrate to be surface-modified, and the raw material containing one or more anions selected from the group consisting of $F^-$ and $Cl^-$ may be heated, and the surface layer in which the surface of the ceramic substrate is modified to the composition including one or more anions selected from the group consisting of $F^-$ and $Cl^-$ may be formed while the raw material vaporized by heating is adsorbed on a surface of the heated ceramic substrate.

The surface layer may be formed by heating and vaporizing the raw material at a temperature of 80 to 500° C. and adsorbing the vaporized raw material on the surface of the ceramic substrate.

A method of manufacturing a plasma-resistant substrate according to an exemplary embodiment of the present invention includes (a) heating and vaporizing a raw material containing one or more anions selected from the group consisting of $F^-$ and $Cl^-$ and (b) forming a surface layer by adsorbing the vaporized raw material on a surface of a ceramic substrate and modifying the surface of the ceramic substrate, wherein the surface layer may be a layer in which an oxide composition component is modified to a composition including one or more anions selected from the group consisting of $F^-$ and $Cl^-$.

The bulk of the ceramic substrate may be made of $Y_2O_3$, $Y_3Al_5O_{12}$, yttria-stabilized zirconia or a zirconia material doped with one or more elements selected from the group consisting of rare earth elements, Ca and Mg.

The surface layer may be formed to a thickness of 100 nm to 50 μm.

The raw material may include one or more solid materials selected from the group consisting of $NH_4F$, $NH_5F_2$, LiF, NaF, KF, $MgF_2$, $CaF_2$, $AlF_3$, and $YF_3$.

The raw material may include one or more solid materials selected from the group consisting of $NH_4Cl$, $YCl_3$, $AlCl_3$, and $TaCl_3$.

The raw material may be a solid material that is a mixture of one or more materials selected from the group consisting of $NH_4F$, $NH_5F_2$, LiF, NaF, KF, $MgF_2$, $CaF_2$, $AlF_3$, and $YF_3$ and one or more materials selected from the group consisting of $NH_4Cl$, $YCl_3$, $AlCl_3$, and $TaCl_3$.

The ceramic substrate to be surface-modified, and the raw material containing one or more anions selected from the group consisting of $F^-$ and $Cl^-$ may be heated, and the surface of the ceramic substrate may be modified to the composition including one or more anions selected from the group consisting of $F^-$ and $Cl^-$ while the raw material vaporized by heating is adsorbed on a surface of the heated ceramic substrate.

The raw material may be heated to a temperature of 80 to 500° C. and vaporized and adsorbed on the surface of the ceramic substrate.

Step (a) may include (c) putting the ceramic substrate to be surface-modified and the raw material containing one or more anions selected from the group consisting of $F^-$ and $Cl^-$ into a crucible, (d) charging the crucible containing the ceramic substrate and the raw material into a chamber provided to control an internal temperature through a heating means, and (e) heating and vaporizing the raw material through the heating means.

In step (c), it is preferable to put the ceramic substrate and the raw material in the crucible so that they are positioned in spaces separated from each other.

The ceramic substrate may be positioned higher than the raw material.

A support higher than a bottom surface of the crucible and smaller than an inner diameter of the crucible may be provided in the crucible, and the raw material may be positioned on the bottom surface of the crucible, and the ceramic substrate may be seated on the support to be positioned higher than the raw material so that the raw material and the ceramic substrate are spatially separated.

Step (a) may include placing the ceramic substrate to be surface-modified in a furnace, putting the raw material for surface modification in a crucible and positioning the raw material for surface modification in the furnace to be spaced apart from the ceramic substrate to be surface-modified, and heating and vaporizing the raw material using a heating means, wherein in the furnace, a heating temperature for the ceramic substrate and a heating temperature for the raw material may be set to be different from each other.

The heating temperature of the raw material may be set lower than the heating temperature of the ceramic substrate.

The ceramic substrate and the raw material may be heated by the heating means, and a carrier gas may flow therethrough so that the vaporized raw material may be moved toward the ceramic substrate and adsorbed on the surface of the ceramic substrate.

Step (a) may include placing the ceramic substrate to be surface-modified in a first furnace, putting the raw material for surface modification in a crucible and placing the crucible in a second furnace, heating the ceramic substrate through a first heating means, and heating and vaporizing the raw material through a second heating means, wherein a heating temperature for the ceramic substrate and a heating temperature for the raw material may be set to be different from each other.

The heating temperature of the raw material may be set lower than the heating temperature of the ceramic substrate.

The ceramic substrate may be heated by the first heating means, the raw material may be heated by the second heating means, and a carrier gas may be supplied to the second furnace so that the vaporized raw material is introduced into the first furnace, the vaporized raw material introduced into the first furnace may be moved toward the ceramic substrate and adsorbed on the surface of the ceramic substrate.

Hereinafter, the plasma-resistant ceramic substrate according to an exemplary embodiment of the present invention will be described in more detail.

When a ceramic substrate material, such as $Y_2O_3$, $Y_3Al_5O_{12}$, yttria-stabilized zirconia or a zirconia material doped with one or more elements selected from the group consisting of rare earth elements, Ca and Mg, is used as a component of semiconductor manufacturing equipment, it is exposed to a plasma process environment including elements (F, Cl, etc.) that cause chemical deterioration of the ceramic substrate. As such, when the ceramic substrate is deteriorated by exposure to the plasma process environment, it appears in the form of contamination (particle type, reactant type) during the semiconductor manufacturing process, and provides a cause for lowering the wafer production yield. In addition, it causes an increase in the cost of post-processing for component recycling such as a cleaning process. The inventors of the present invention are studying a technique of applying a coating having a composition of an F-based material such as a fluoride or oxyfluoride such as $YF_3$ and $YO_xF_y$ to the surface of the ceramic substrate in order to reduce the deterioration of oxide parts by the plasma process, and are conducting research on better coating technology and materials.

Conventionally, in order to obtain a composition including fluorine to improve plasma resistance, a process of synthesizing solid raw materials including fluorine first, a process of spheroidizing the synthesized raw material into spherical granules of 10 to 50 μm, and a coating process using expensive equipment such as plasma spraying need to be used. In this case, in addition to including a process of synthesizing and spheroidizing solid raw materials including expensive fluorine in advance, there is a disadvantage in that fluorine is volatilized or oxidized by high heat generated during the plasma spraying process, so that the coating is not made with a desired composition. In addition, when manufacturing a plasma-resistant member coated with a composition including fluorine by a conventional method, in order to obtain the desired exact shape and size, a process of manufacturing a separate substrate whose size and shape are precisely controlled needs to be performed in advance, taking into account the expected thickness of the coating, which varies from 0.03 to 0.2 mm depending on the position of the member, and a process of additionally precisely coating the substrate is included, and thus there is a disadvantage in that production costs are very high. In addition, when a shape of the substrate, which is a base material of coating, has an internal structure such as a hole or a curved shape, it is impossible to uniformly coat all surfaces of the substrate with conventional coating methods. As conventional coating methods, methods such as PVD as well as plasma spraying have the same limitations.

The present invention proposes a plasma-resistant ceramic substrate with enhanced plasma resistance and durability through surface modification of ceramic oxide parts used in semiconductor chip production process equipment (etching, CVD coating, etc.). It is possible to improve the plasma resistance and durability by modifying the surface of the ceramic substrate using low-cost heat treatment technology using raw materials (salts, etc.) containing F, Cl, or the like.

FIG. 1 is a view showing a plasma-resistant ceramic substrate according to an exemplary embodiment of the present invention.

Referring to FIG. 1, the plasma-resistant ceramic substrate according to an exemplary embodiment of the present invention includes a bulk 10*a* of an oxide composition, and a surface layer 10*b* in which an oxide composition component constituting the bulk was modified to a composition including one or more anions selected from the group consisting of $F^-$ and $Cl^-$.

In the case of a ceramic substrate with a stable crystal structure such as alumina, since it is difficult to form ceramics with complex anionic compositions (—OF, —OCl, —FCl, etc.) by penetration and substitution of anions, oxides which are relatively free from penetration and substitution of anionic elements such as $F^-$ and $Cl^-$ are used. The bulk of the ceramic substrate may be made of $Y_2O_3$, $Y_3Al_5O_{12}$, yttria-stabilized zirconia or a zirconia material doped with one or more elements selected from the group consisting of rare earth elements, Ca and Mg. The rare earth element may be La, Ce, Pr, Nd, Pm, Sm, Eu, Gd, Tb, Dy, Ho, Er, Tm, Yb, or the like.

Since yttria ($Y_2O_3$) has excellent chemical stability and heat resistance, it is widely used in a wide range of fields, such as plasma resistance, as well as high-temperature corrosion-resistant engine materials, nozzle materials for jet-casting of molten metal, and container materials for melting highly reactive metals such as lithium and uranium.

Zirconia ($ZrO_2$) has a molecular weight of about 123.22, a melting point of about 2,700° C., and a high refractive index and a high melting point, so that it has high corrosion resistance. Zirconia (zirconium oxide ($ZrO_2$)) has the advantages of having the lowest thermal conductivity among many ceramic materials, high thermal stability, and a very high thermal expansion coefficient. However, pure zirconia has monoclinic↔tetragonal↔cubic phase transformation characteristics accompanied by a volume change according to a temperature change. This volume change during phase transformation is a major factor in deteriorating zirconia. In order to overcome this phase transformation problem, zirconia is stabilized by adding a ceramic substrate such as yttria ($Y_2O_3$), magnesia (MgO), calcia (CaO), and ceria ($CeO_2$) (meaning stabilized zirconia). In particular, zirconia stabilized by adding yttria ($Y_2O_3$) is called yttria-stabilized zirconia (YSZ). As described above, zirconia ($ZrO_2$) undergoes volume expansion during a phase transition from a tetragonal phase to a monoclinic phase, and when such volume expansion occurs, it may be vulnerable to thermal shock, and in order to solve the problem of being vulnerable to thermal shock, stabilized zirconia is prepared by adding an oxide such as yttria ($Y_2O_3$).

The surface layer is a layer in which a raw material (a raw material containing one or more elements selected from the group consisting of fluorine and chlorine) containing one or more anions selected from the group consisting of $F^-$ and $Cl^-$ is vaporized by heating and adsorbed on the surface of the ceramic substrate to be modified to a composition including one or more anions selected from the group consisting of $F^-$ and $Cl^-$.

The ceramic substrate to be surface-modified, and the raw material (a raw material containing one or more elements selected from the group consisting of fluorine and chlorine) containing one or more anions selected from the group consisting of $F^-$ and $Cl^-$ may be heated, and the surface layer in which the surface of the ceramic substrate is modified to the composition including one or more anions selected from the group consisting of $F^-$ and $Cl^-$ may be formed as the raw material vaporized by heating is adsorbed on a surface of the heated ceramic substrate. It is also possible to perform heating while spatially separating a portion for heating the raw material containing one or more anions selected from the group consisting of $F^-$ and $Cl^-$ and the ceramic substrate to be surface-modified. In the case of spatial separation, there are advantages of separately adjusting the temperature of the ceramic substrate to be surface-modified and the temperature at which the raw material is heated, and an advantage in securing a means capable of controlling the composition of the surface layer or the production rate of the surface layer by separately introducing a carrier gas having a controlled composition that transports the gaseous phase. In addition, a method of increasing the speed of surface modification may be included when activating the gas phase by placing a plasma generator or the like in a gas phase movement path enabling surface modification.

The surface layer may be formed by heating the raw material to a temperature of 80 to 500° C. and vaporizing the material and adsorbing the raw material on the surface of the ceramic substrate.

The raw material may be a material including one or more elements selected from the group consisting of fluorine and chlorine, and more specifically, a material containing one or more anions selected from the group consisting of $F^-$ and $Cl^-$. The raw material may include one or more solid materials selected from the group consisting of $NH_4F$, $NH_5F_2$, LiF, NaF, KF, $MgF_2$, $CaF_2$, $AlF_3$, and $YF_3$. The raw material may include one or more solid materials selected from the group consisting of $NH_4Cl$, $YCl_3$, $AlCl_3$, and $TaCl_3$. The raw material may be a solid material that is a mixture of one or more materials selected from the group consisting of $NH_4F$, $NH_5F_2$, LiF, NaF, KF, $MgF_2$, $CaF_2$, $AlF_3$, and $YF_3$ and one or more materials selected from the group consisting of $NH_4Cl$, $YCl_3$, $AlCl_3$, and $TaCl_3$.

As the raw material for modifying the surface of the ceramic substrate, a raw material (for example, $NH_4F$) containing highly reactive anions such as $F^-$ and $Cl^-$ is used.

Examples of raw materials containing highly reactive $F^-$ ions may include $NH_4F$, $NH_5F_2$, LiF, NaF, KF, $MgF_2$, $CaF_2$, $AlF_3$, $YF_3$, or mixtures thereof. Examples of raw materials containing highly reactive $Cl^-$ ions may include $NH_4Cl$, $YCl_3$, $AlCl_3$, $TaCl_3$, or mixtures thereof. Two or more of the raw materials may be used, and a solid low reactive diluent may be mixed and used to control the amount of volatilization. For example, a mixture of $NH_4F$ and LiF containing highly reactive $F^-$ ions, and the like are exemplified. Of course, the raw material containing highly reactive $F^-$ ions and the raw material containing highly reactive $Cl^-$ ions may be mixed and used.

A non-reactive solid diluent may be further mixed with the raw material and heated together with the raw material, and the amount of the raw material vaporized by heating may be controlled by the non-reactive solid diluent. The non-reactive solid diluent is a non-reactive material that is not vaporized even by the heat treatment (heating), and examples thereof may include $Al_2O_3$, or the like. The non-reactive solid diluent is preferably mixed in an amount of 10 to 70 parts by weight based on 100 parts by weight of the raw material.

In addition, an inert carrier gas may be introduced while the vaporized raw material moves to the ceramic substrate to control a concentration of the vaporized raw material or an atmosphere for surface modification. Examples of the inert carrier gas include gases such as argon (Ar) and nitrogen ($N_2$). The inert carrier gas is preferably introduced at a flow rate of about 1 to 100 sccm.

In addition, air or oxygen ($O_2$) gas may be introduced while the vaporized raw material moves to the ceramic substrate, and thus the oxygen content of the surface layer to be modified may be controlled. The air or oxygen ($O_2$) gas may be introduced together with the inert carrier gas. The air or oxygen ($O_2$) gas is preferably introduced at a flow rate of about 0.1 to 100 sccm.

The raw material is heated and vaporized, and the vaporized raw material is adsorbed on the surface of the ceramic substrate to form a surface layer on the surface of the ceramic substrate. The surface of the ceramic substrate may be modified through heat treatment (heating) using a raw material containing anions. The raw material is vaporized by heat treatment (heating), and surface modification occurs as the vaporized raw material is adsorbed on the surface of the ceramic substrate. The heat treatment (heating) is preferably performed at a temperature of 80 to 500° C., and more preferably 100 to 400° C. in an inert gas atmosphere such as argon, helium, or nitrogen or under a closed condition. In order to adjust an O/F ratio of the surface layer, oxygen may be additionally supplied to the inert gas atmosphere to adjust the gas atmosphere. Anionic elements such as $F^-$ and $Cl^-$ penetrate into the ceramic substrate and surface modification is performed on the surface of the ceramic substrate by the heat treatment (heating), and the plasma resistance and durability of the ceramic substrate can be enhanced by the surface modification. The raw material and the ceramic substrate are heated and vaporized by a heating means, and the vaporized raw material penetrates into the ceramic substrate surface while adsorbed on the surface of the ceramic substrate, and surface modification occurs on the surface of the ceramic substrate while being substituted with elements constituting the surface of the ceramic substrate (substitutional diffusion) or invading between element sites constituting the surface of the ceramic substrate (interstitial diffusion), and the surface layer is formed on the surface of the ceramic substrate. When the surface is modified using the raw material containing highly reactive $F^-$ ions, a surface layer containing an F element is formed on the surface of the ceramic substrate, and when the surface is modified using the raw material containing highly reactive $Cl^-$ ions, a surface layer containing a Cl element is formed on the surface of the ceramic substrate. When the raw material containing highly reactive $F^-$ ions and the raw material containing highly reactive $Cl^-$ ions are used together, a surface layer containing the F element and Cl element is formed on the surface of the ceramic substrate. As an example, when the surface of an yttria ($Y_2O_3$) substrate, which is a ceramic substrate, is modified according to the present invention, when heat treatment is performed using $NH_4F$ as a surface modification raw material, the surface of the yttria ($Y_2O_3$) substrate is modified to $YO_xF_y$ (where x is a real number that is a positive number of 1.5 or less, and y is a real number that is a positive number of 3 or less). As another example, when the surface of an yttria ($Y_2O_3$) substrate, which is a ceramic substrate, is modified according to the present invention, when heat treatment is performed using $NH_4Cl$ as a surface modification raw material, the surface of the yttria ($Y_2O_3$) substrate is modified to $YO_xCl_y$ (where x is a real number that is a positive number of 1.5 or less, and y is a real number that is a positive number of 3 or less).

The heat treatment is preferably performed for 1 to 48 hours, and more preferably for 6 to 24 hours. When the heat treatment time is too long, it is not economical because it consumes a lot of energy, and since the surface modification of sufficient thickness is already obtained, it is difficult to expect a further surface modification effect, and when the heat treatment time is short, it may be difficult to expect desired plasma resistance due to incomplete surface modification. The heat treatment may be performed by raising the temperature to the heat treatment temperature at a predetermined temperature increase rate (for example, 1 to 50° C./min), maintaining a predetermined time (for example, about 1 to 48 hours) for heat treatment, lowering the temperature, and then unloading the surface-modified product (heat treatment product).

It is preferable that the thickness of the surface layer formed on the surface of the ceramic substrate (thickness to be surface-modified on the surface of the ceramic substrate) is about 100 nm to 50 μm. The thickness of the surface layer can be adjusted by controlling the used raw material, the heat treatment temperature, the heat treatment time, the surface modification time, the amount of carrier gas, and the presence or absence of a volatile material activation process. A composition of the surface layer can also be adjusted by controlling the used raw material, the heat treatment temperature, the composition of the carrier gas, and the like.

Hereinafter, a method of manufacturing a plasma-resistant ceramic substrate according to an exemplary embodiment of the present invention will be described in more detail.

When a ceramic substrate material, such as $Y_2O_3$, $Y_3Al_5O_{12}$, yttria-stabilized zirconia or a zirconia material doped with one or more elements selected from the group consisting of rare earth elements, Ca and Mg, is used as a component of semiconductor manufacturing equipment, it is exposed to a plasma process environment including elements (F, Cl, etc.) that cause chemical deterioration of the ceramic substrate. As such, when the ceramic substrate is deteriorated by exposure to the plasma process environment, it appears in the form of contamination (particle type, reactant type) during the semiconductor manufacturing process, and provides a cause for lowering the wafer production yield. In addition, it causes an increase in the cost of post-processing for component recycling such as a cleaning process. The inventors of the present invention are studying a technique of applying a coating having a composition of an F-based material such as a fluoride or oxyfluoride such as $YF_3$ and YOF to the surface of the ceramic substrate in order to reduce the deterioration of oxide parts by the plasma process, and are conducting research on better coating technology and materials.

Conventionally, in order to obtain a composition including fluorine to improve plasma resistance, a process of synthesizing solid raw materials including fluorine first, a process of spheroidizing the synthesized raw material into spherical granules of 10 to 50 μm, and a coating process using expensive equipment such as plasma spraying need to be used. In this case, in addition to including a process of synthesizing and spheroidizing solid raw materials including expensive fluorine in advance, there is a disadvantage in that fluorine is volatilized by high heat generated during the plasma spraying process, so that the coating is not made with a desired composition. In addition, when preparing a coating including fluorine by a conventional method, in order to obtain a desired shape, a process of manufacturing a separate substrate needs to be performed in advance, and since a process of additionally coating the substrate is included, production costs are very high.

The present invention proposes a method of manufacturing a plasma-resistant ceramic substrate with enhanced plasma resistance and durability through surface modification of ceramic oxide parts used in semiconductor chip production process equipment (etching, CVD coating, etc.). It is possible to improve the plasma resistance and durability by modifying the surface of the ceramic substrate using low-cost heat treatment technology using raw materials (salts, etc.) containing F, Cl, or the like.

In the present invention, a surface of the ceramic substrate 10 is modified through a low-cost heat treatment technique at a low temperature of 500° C. or less using a raw material (for example, $NH_4F$) containing highly reactive anions such as $F^-$ and $Cl^-$. When compared to overlay coating technology that requires expensive coating equipment and raw materials, it can be seen as a surface modification technology that has equivalent or better plasma resistance by applying low-cost raw materials and low-cost heat treatment process technology.

In the case of a ceramic substrate with a stable crystal structure such as alumina, since it is difficult to form ceramics with complex anionic compositions (—OF, —OCl, —FCl, etc.) by penetration and substitution of anions, oxides which are relatively free from penetration and substitution of anionic elements such as $F^-$ and $Cl^-$ are used.

Considering this point, the ceramic substrate may be made of $Y_2O_3$, $Y_3Al_5O_{12}$, yttria-stabilized zirconia (YSZ) or a zirconia material doped with one or more elements selected from the group consisting of rare earth elements (La, Ce, Pr, Nd, Pm, Sm, Eu, Gd, Tb, Dy, Ho, Er, Tm, Yb, etc.), Ca and Mg.

Since yttria ($Y_2O_3$) has excellent chemical stability and heat resistance, it is widely used in a wide range of fields, such as high-temperature corrosion-resistant engine materials, nozzle materials for jet-casting of molten metal, and container materials for melting highly reactive metals such as lithium and uranium.

Zirconia ($ZrO_2$) has a molecular weight of about 123.22, a melting point of about 2,700° C., and a high refractive index and a high melting point, so that it has high corrosion resistance. Zirconia (zirconium oxide ($ZrO_2$)) has the advantages of having the lowest thermal conductivity among many ceramic materials, high thermal stability, and a very high thermal expansion coefficient. However, pure zirconia has monoclinic↔tetragonal↔cubic phase transformation characteristics accompanied by a volume change according to a temperature change. This volume change during phase transformation is a major factor in deteriorating zirconia. In order to overcome this phase transformation problem, zirconia is stabilized by adding a ceramic substrate such as yttria ($Y_2O_3$), magnesia (MgO), calcia (CaO), and ceria ($CeO_2$) (meaning stabilized zirconia). In particular, zirconia stabilized by adding yttria ($Y_2O_3$) is called yttria-stabilized zirconia (YSZ). As described above, zirconia ($ZrO_2$) undergoes volume expansion during a phase transition from a tetragonal phase to a monoclinic phase, and when such volume expansion occurs, it may be vulnerable to thermal shock, and in order to solve the problem of being vulnerable to thermal shock, stabilized zirconia is prepared by adding an oxide such as yttria ($Y_2O_3$).

A raw material is prepared. The raw material may be a material including one or more elements selected from the group consisting of F and Cl, and more specifically, a material containing one or more anions selected from the group consisting of $F^-$ and $Cl^-$. The raw material may be a solid raw material containing one or more anions selected from the group consisting of $F^-$ and $Cl^-$. The raw material may include one or more solid materials selected from the group consisting of $NH_4F$, $NH_5F_2$, LiF, NaF, KF, $MgF_2$, $CaF_2$, $AlF_3$, and $YF_3$. The raw material may include one or more solid materials selected from the group consisting of $NH_4Cl$, $YCl_3$, $AlCl_3$, and $TaCl_3$. The raw material may be a solid material that is a mixture of one or more materials selected from the group consisting of $NH_4F$, $NH_5F_2$, LiF, NaF, KF, $MgF_2$, $CaF_2$, $AlF_3$, and $YF_3$ and one or more materials selected from the group consisting of $NH_4Cl$, $YCl_3$, $AlCl_3$, and $TaCl_3$.

As the raw material for modifying the surface of the ceramic substrate, a raw material (for example, $NH_4F$) containing highly reactive anions such as $F^-$ and $Cl^-$ is used. Examples of raw materials containing highly reactive $F^-$ ions may include $NH_4F$, $NH_5F_2$, LiF, NaF, KF, $MgF_2$, $CaF_2$, $AlF_3$, $YF_3$, or mixtures thereof. Examples of raw materials containing highly reactive $Cl^-$ ions may include $NH_4Cl$, $YCl_3$, $AlCl_3$, $TaCl_3$, or mixtures thereof. Two or more of the raw materials may be used. For example, a mixture of $NH_4F$ and $CH_4F$ containing highly reactive $F^-$ ions, and the like are exemplified. Of course, the raw material containing highly reactive $F^-$ ions and the raw material containing highly reactive $Cl^-$ ions may be mixed and used.

A method of manufacturing a plasma-resistant substrate according to an exemplary embodiment of the present invention includes heating and vaporizing a raw material containing one or more anions selected from the group consisting of $F^-$ and $Cl^-$ and forming a surface layer by adsorbing the vaporized raw material on a surface of a ceramic substrate and modifying the surface of the ceramic substrate. The surface layer is a layer in which an oxide composition component constituting the bulk was modified to a composition including one or more anions selected from the group consisting of $F^-$ and $Cl^-$.

The ceramic substrate to be surface-modified, and the raw material containing one or more anions selected from the group consisting of $F^-$ and $Cl^-$ may be heated, and the surface of the ceramic substrate may be modified to a composition including one or more anions selected from the group consisting of $F^-$ and $Cl^-$ while the raw material vaporized by heating is adsorbed on a surface of the heated ceramic substrate.

The surface of the ceramic substrate is modified through heat treatment using a raw material containing anions. The raw material is vaporized by heat treatment, and surface modification occurs as the vaporized raw material is adsorbed on the surface of the ceramic substrate. The heat treatment (heating) is preferably performed at a temperature of 80 to 500° C., and more preferably 100 to 400° C. in an inert gas atmosphere such as argon, helium, or nitrogen or under a closed condition. In order to adjust an O/F ratio of the surface layer, oxygen may be additionally supplied to the inert gas atmosphere to adjust the gas atmosphere. Anionic elements such as $F^-$ and $Cl^-$ penetrate into the ceramic substrate and surface modification is performed on the surface of the ceramic substrate by the heat treatment (heating), and the plasma resistance and durability of the ceramic substrate can be enhanced by the surface modification. The raw material and the ceramic substrate are heated and vaporized by a heating means, and the vaporized raw material penetrates into the ceramic substrate surface while adsorbed on the surface of the ceramic substrate, and surface modification occurs on the surface of the ceramic substrate 10 while being substituted with elements constituting the surface of the ceramic substrate (substitutional diffusion) or invading between element sites constituting the surface of the ceramic substrate (interstitial diffusion), and the surface layer is formed on the surface of the ceramic substrate. When the surface is modified using the raw material containing highly reactive $F^-$ ions, a surface layer containing an F element is formed on the surface of the ceramic substrate, and when the surface is modified using the raw material containing highly reactive $Cl^-$ ions, a surface layer containing a Cl element is formed on the surface of the ceramic substrate. When the raw material containing highly reactive $F^-$ ions and the raw material containing highly reactive $Cl^-$ ions are used together, a surface layer containing the F element and Cl element is formed on the surface of the ceramic substrate. As an example, when the surface of an yttria ($Y_2O_3$) substrate, which is a ceramic substrate, is modified according to the present invention, when heat treatment is performed using $NH_4F$ as a surface modification raw material, the surface of the yttria ($Y_2O_3$) substrate is modified to $YO_xF_y$ (where x is a real number that is a positive number of 1.5 or less, and y is a real number that is a positive number of 3 or less). As another example, when the surface of an yttria ($Y_2O_3$) substrate, which is a ceramic substrate, is modified according to the present invention, when heat treatment is performed using $NH_4Cl$ as a surface modification raw material, the surface of the yttria ($Y_2O_3$) substrate is modified to $YO_xCl_y$ (where x is a real number that is a positive number of 1.5 or less, and y is a real number that is a positive number of 3 or less).

The heat treatment is preferably performed for 1 to 48 hours, and more preferably for 6 to 24 hours. When the heat treatment time is too long, it is not economical because it consumes a lot of energy, and since the surface modification of sufficient thickness is already obtained, it is difficult to expect a further surface modification effect, and when the heat treatment time is short, it may be difficult to expect desired plasma resistance due to incomplete surface modification. The heat treatment may be performed by raising the temperature to the heat treatment temperature at a predetermined temperature increase rate (for example, 1 to 50° C./min), maintaining a predetermined time (for example, about 1 to 48 hours) for heat treatment, lowering the temperature, and then unloading the surface-modified product (heat treatment product).

A non-reactive solid diluent may be further mixed with the raw material and heated together with the raw material, and an amount of the raw material vaporized by heating may be controlled by the non-reactive solid diluent. The non-reactive solid diluent is a non-reactive material that is not vaporized even by the heat treatment (heating), and examples thereof may include $Al_2O_3$, or the like. The non-reactive solid diluent is preferably mixed in an amount of 0.1 to 100 parts by weight based on 100 parts by weight of the raw material.

In addition, an inert carrier gas may be introduced while the vaporized raw material moves to the ceramic substrate to control a concentration of the vaporized raw material or to control an atmosphere for surface modification. Examples of the inert carrier gas include gases such as argon (Ar) and nitrogen ($N_2$). The inert carrier gas is preferably introduced at a flow rate of about 1 to 100 sccm.

In addition, air or oxygen ($O_2$) gas may be introduced to control an oxygen content of a surface layer to be modified while the vaporized raw material moves to the ceramic substrate. The air or oxygen ($O_2$) gas may be introduced together with the inert carrier gas. The air or oxygen ($O_2$) gas is preferably introduced at a flow rate of about 0.11 to 100 sccm.

It is preferable that the thickness of the surface layer formed on the surface of the ceramic substrate (thickness to be surface-modified on the surface of the ceramic substrate) is about 100 nm to 50 μm. The thickness of the surface layer can be adjusted by controlling the used raw material, the heat treatment temperature, the heat treatment time, the surface modification time, the amount of carrier gas, and the presence or absence of a volatile material activation process. A composition of the surface layer can also be adjusted by controlling the used raw material, the heat treatment temperature, the composition of the carrier gas, and the like.

Figure 2:
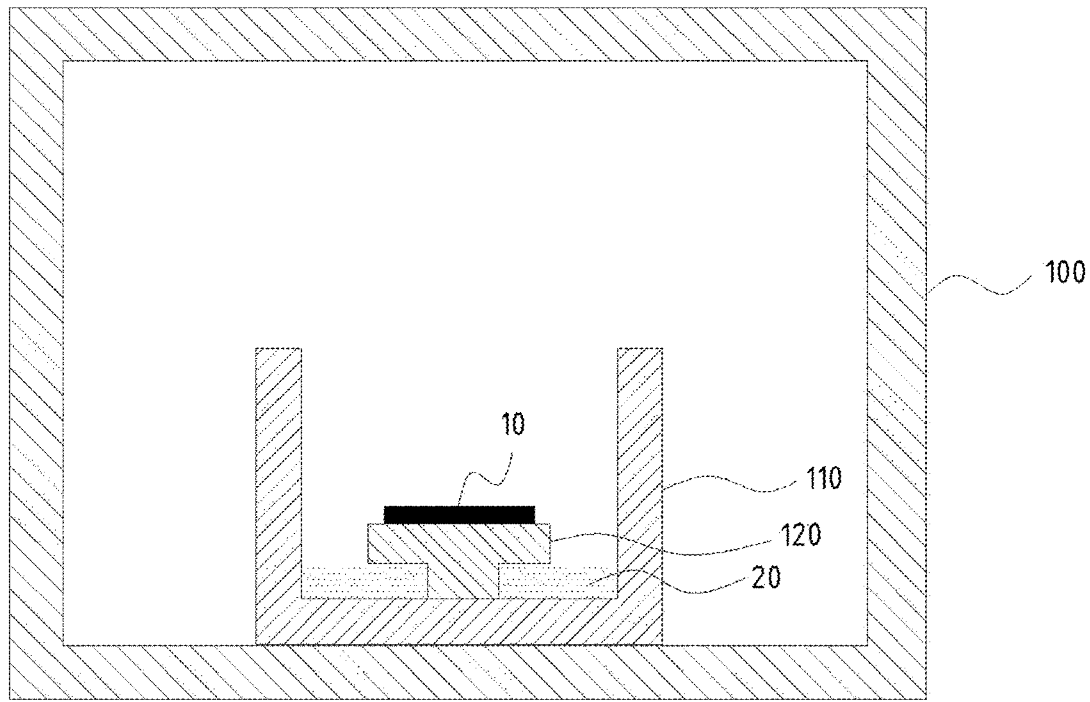
FIGS. 2 and 3 are views showing an example of a system (device) for surface modification of a ceramic substrate.
Figure 3:
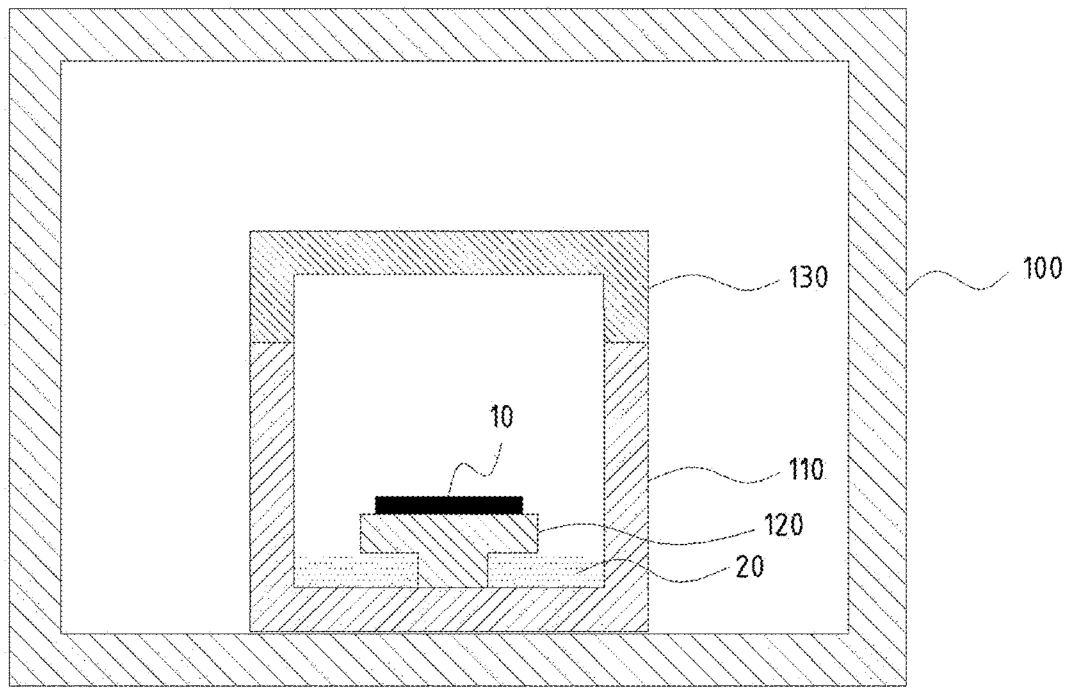

FIGS. 2 and 3 are views showing an example of a system (device) for surface modification of a ceramic substrate.

Referring to FIGS. 2 and 3, the system (device) for surface modification of a ceramic substrate includes a chamber 100 provided to control an internal temperature through a heating means, a crucible 110 accommodated in the chamber 100, a ceramic substrate (oxide component) 10 to be surface-modified accommodated in the crucible 110, and a raw material 20 accommodated in the crucible 110 to surface-modify the ceramic substrate 10. The raw material 20 is a material containing one or more anions selected from the group consisting of $F^-$ and $Cl^-$.

The ceramic substrate 10 and the raw material 20 are put in the crucible 110 at a predetermined volume ratio (for example, ceramic substrate:raw material=1:0.1 to 1:50). It is preferable to place the ceramic substrate 10 and the raw material 20 in the crucible 110 so as to be positioned in spaces separated from each other. The crucible 110 is preferably made of a material having a high hardness and a high melting point such as alumina ($Al_2O_3$), graphite, carbon (carbon excluding graphite), tungsten, or tantalum, and this is because in the case of using a crucible 110 made of a material with a low melting point, it may act as an impurity in a subsequent heat treatment process. The ceramic substrate to be surface-modified and the raw material may be separated into separate spaces, for example, the raw material may be put in a crucible, and the crucible accommodating the raw material and the ceramic substrate may be separately charged into a chamber, so that the ceramic substrate and the raw material are spatially separated, and in this case, the ceramic substrate is positioned outside the crucible.

As shown in FIG. 3, the crucible 110 may further include a cover 130 for covering an upper portion. The crucible 110 may have a structure that may be sealed by the cover 130.

The system (device) for surface modification of the ceramic substrate may further include a support 120 provided higher than a bottom surface of the crucible 110 and smaller than an inner diameter of the crucible 110, and preferably, the ceramic substrate 10 seated on the support 120 is positioned higher than the raw material 20. The support 120 is positioned on a lower surface of the crucible 110, the ceramic substrate 10 to be surface-modified is positioned thereon, and the raw material 20 containing highly reactive anions is positioned on a bottom surface of the crucible 110. The position at which the ceramic substrate 10 is seated may be adjusted by adjusting a height of the support 120. In this way, the ceramic substrate and the raw material may be spatially separated by using the support 120.

The position of the ceramic substrate 10 to be surface-modified may be determined by adjusting a thickness (or height) of the support 120. In order to adjust the position of the ceramic substrate 10 to be surface-modified, the support 120 may have various thicknesses (or heights). For example, when using the support 120 having a large thickness (or height), the ceramic substrate 10 is positioned toward the upper side of the crucible 110 compared to the case where the thickness (or height) of the support 120 is small.

The crucible 110 containing the ceramic substrate 10 and the raw material 20 is charged into the chamber 100 provided to control the internal temperature through a heating means. The chamber 100 is set to be able to adjust a temperature through the heating means (not shown).

The chamber 100 is preferably made of a heat-resistant material (for example, alumina ($Al_2O_3$) material) that is chemically stable and has a melting point higher than a heat treatment temperature. The heating means is provided to surround the chamber 100 and serves to heat the raw material 20 and the ceramic substrate 10. The heating means serves to raise the internal temperature of the chamber 100 to a target temperature (for example, 80 to 500° C.) and keep it constant. The heating means may use resistance heating by a heating element, high-frequency induction heating, or the like. The temperature in the chamber 100 can be kept constant by the heating means.

The chamber 100 may be provided with a gas inlet (not shown) through which gas is introduced. A gas such as a carrier gas or air may be introduced into the chamber 100 through the gas inlet.

The chamber 100 may be provided with a gas outlet (not shown), and an exhaust device (not shown) such as a pump may be installed in the gas outlet, through which the gas remaining in the chamber 100 after heat treatment may be discharged to the outside.

A cooling cylinder (not shown) may be provided around the chamber 100, and overheating of the inside of the chamber 100 can be suppressed and rapidly cooled by water-cooling with cooling water (CW) flowing inside the cooling cylinder. The cooling water is supplied to the cooling cylinder by connecting a cooling water inlet (CWI), the supplied cooling water is discharged through a cooling water outlet (CWO), and it is preferable to allow the cooling water to circulate through the cooling cylinder so that the chamber 100 can be evenly cooled throughout.

A surface of the ceramic substrate 10 may be modified by heating the raw material 20 through the heating means and adsorbing the vaporized raw material on the surface of the ceramic substrate 10. A surface layer is formed by the surface modification, and the surface layer is a layer in which an oxide composition component constituting the bulk was modified to a composition including one or more anions selected from the group consisting of $F^-$ and $Cl^-$.

Figure 4:
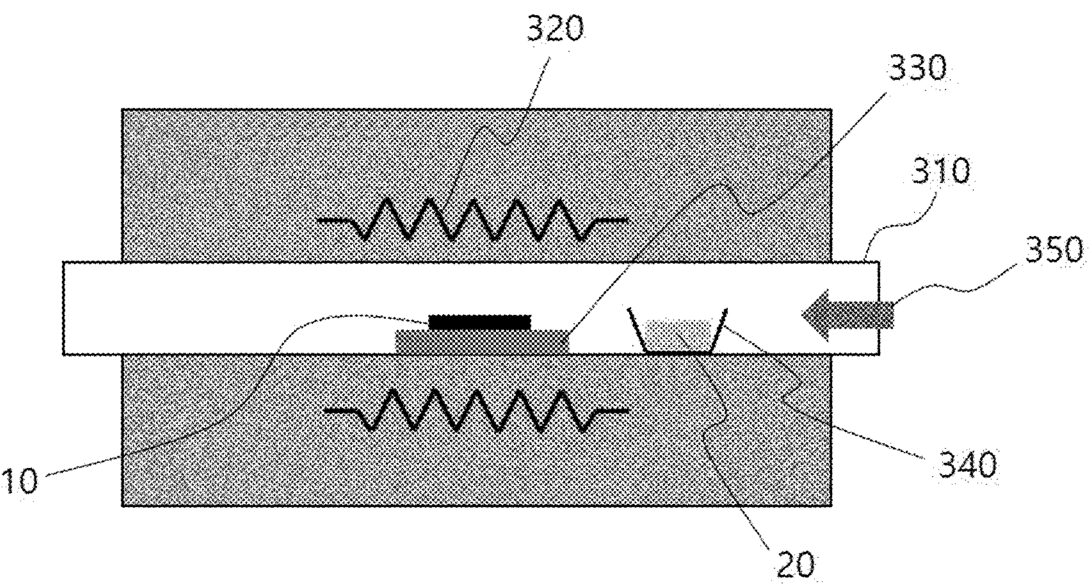
FIGS. 4 and 5 are views showing another example of a system (device) for surface modification of a ceramic substrate.
Figure 5:
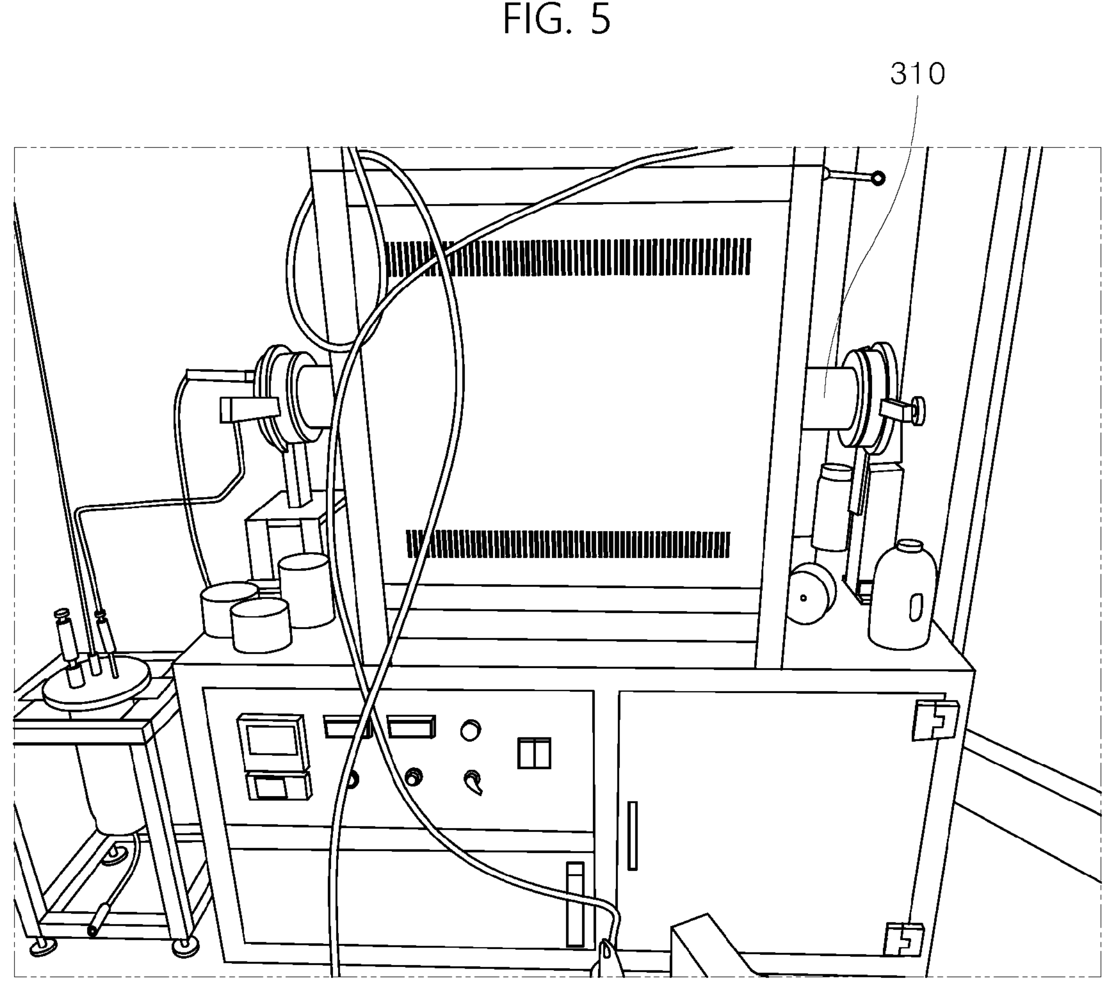

FIGS. 4 and 5 are views showing another example of a system (device) for surface modification of a ceramic substrate.

Referring to FIGS. 4 and 5, the system (device) for surface modification of a ceramic substrate includes a furnace 310 provided to control an internal temperature through a heating means 320, a ceramic substrate (oxide part) 10 accommodated in the furnace 310, and a raw material 20 accommodated in a crucible 340 to surface-modify the ceramic substrate. The raw material 20 may be a material containing one or more anions selected from the group consisting of $F^-$ and $Cl^-$.

The furnace 310 may include a tube furnace, a muffle furnace, or the like, and may be provided to control an internal temperature through the heating means 320. The furnace 310 may be made of alumina ($Al_2O_3$) material, which is chemically stable and has a melting point higher than a heat treatment temperature, which is a heat-resistant material. Preferably, the ceramic substrate 10 is seated on a support 330 that is higher than a bottom surface of the furnace 310 and smaller than an inner diameter of the furnace 310. The heating means 320 is provided to surround the furnace 310 and serves to heat the raw material 20 and the ceramic substrate 10. The heating means 320 serves to raise the internal temperature of the furnace 310 to a target temperature (for example, 80 to 500° C.) and keep it constant. The heating means 320 may use resistance heating by a heating element, high-frequency induction heating, or the like. The temperature in the furnace 310 can be kept constant by the heating means 320.

The furnace 310 may be provided with a gas inlet (not shown) through which gas is introduced. A gas such as a carrier gas or air may be introduced into the furnace 310 through the gas inlet.

The furnace 310 may be provided with a gas outlet (not shown), and an exhaust device (not shown) such as a pump may be installed in the gas outlet, through which the gas remaining in the furnace 310 after heat treatment may be discharged to the outside.

A cooling cylinder (not shown) may be provided around the furnace 310, and overheating of the inside of the furnace 310 can be suppressed and rapidly cooled by water-cooling with cooling water (CW) flowing inside the cooling cylinder. The cooling water is supplied to the cooling cylinder by connecting a cooling water inlet (CWI), the supplied cooling water is discharged through a cooling water outlet (CWO), and it is preferable to allow the cooling water to circulate through the cooling cylinder so that the furnace 310 can be evenly cooled throughout.

The ceramic substrate 10 to be surface-modified is put in the furnace 310, and the raw material 20 for surface modification is put in the crucible 340 and positioned to be spaced apart from the ceramic substrate 10 in the furnace 310. Heating temperatures for the position of the ceramic substrate 10 and the position of the raw material 20 in the furnace 310 may be set differently. The crucible 340 is preferably made of a material having a high hardness and a high melting point such as alumina ($Al_2O_3$), graphite, carbon (carbon excluding graphite), tungsten or tantalum, and this is because in the case of using a crucible 340 made of a material with a low melting point, it may act as an impurity in a subsequent heat treatment process.

The ceramic substrate and the raw material are heated by the heating means 320, and, the vaporized raw material is moved toward the substrate 10 by flowing a carrier gas 350 and adsorbed on the surface of the ceramic substrate 10 to modify the surface of the ceramic substrate 10. It is preferable to set the heating temperature for the ceramic substrate 10 and the heating temperature for the raw material 20 to be different from each other. For example, the ceramic substrate 10 is heated at 150 to 500° C., and the raw material 20 is heated at 100 to 450° C. It is preferable to set the temperature at which the raw material is heated lower than the temperature at which the ceramic substrate 10 is heated. The heating is performed for 10 minutes to 48 hours, more preferably 1 to 24 hours, and most preferably 2 to 12 hours. The carrier gas may be an inert gas such as argon (Ar) or helium (He) or an inert gas such as nitrogen ($N_2$) gas. The carrier gas is preferably supplied at a flow rate of 0.01 to 2.0 L/min, and more preferably 0.1 to 1.0 L/min. The carrier gas is supplied from one end of the furnace 310 close to the side where the raw material 20 is positioned so that it can move to the other end of the furnace 310. The vaporized raw material takes advantage of the flow of the carrier gas and moves to the side where the substrate is positioned.

The vaporized raw material moves to the ceramic substrate 10 to be surface-modified, and the $F^-$ anion penetrates into the ceramic substrate 10 to undergo surface modification on the surface of the ceramic substrate, and a surface-modified surface layer with a composition including one or more anions selected from the group consisting of $F^-$ and $Cl^-$ is formed on the surface of the ceramic substrate. The surface layer is a layer in which an oxide composition component constituting the bulk was modified to a composition including one or more anions selected from the group consisting of $F^-$ and $Cl^-$. The thickness of the surface-modified ceramic substrate (a combined thickness of the bulk and surface layers) is the same as the thickness of the ceramic substrate before surface modification, or becomes thicker due to volume expansion of the surface layer by a surface modification process.

Figure 6:
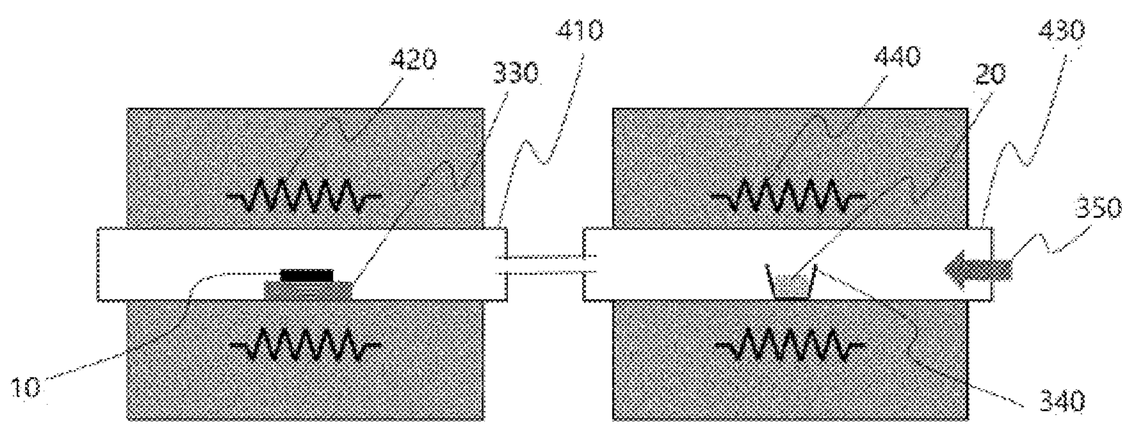
FIG. 6 is a view showing still another example of a system (device) for surface modification of a ceramic substrate.

FIG. 6 is a view showing still another example of a system (device) for surface modification of a ceramic substrate.

Referring to FIG. 6, the system (device) for surface modification of the ceramic substrate includes a first furnace 410 provided to control an internal temperature through a first heating means 420, a ceramic substrate (oxide component) 10 accommodated in the first furnace 410, a second furnace 430 provided to control an internal temperature through a second heating means 440, and a raw material 20 accommodated in the second furnace 430 to surface-modify the ceramic substrate 10. The raw material 20 may be a material containing one or more anions selected from the group consisting of $F^-$ and $Cl^-$. The first furnace 410 and the second furnace 430 are connected to each other.

The first furnace 410 may include a tube furnace, a muffle furnace, or the like, and may be provided to control an internal temperature through the first heating means 420. The second furnace 430 may include a tube furnace, a muffle furnace, or the like, and may be provided to control an internal temperature through the second heating means 440. The first and second furnaces may be made of a heat-resistant alumina ($Al_2O_3$) material, which is chemically stable and has a melting point higher than a heat treatment temperature. Preferably, the ceramic substrate 10 is seated on a support 330 that is higher than a bottom surface of the first furnace 410 and smaller than an inner diameter of the first furnace 410. The first heating means 420 is provided to surround the first furnace 410 and serves to heat the ceramic substrate 10. The first heating means 420 serves to raise the internal temperature of the first furnace 410 to a target temperature (for example, 80 to 500° C.) and keep it constant. The first heating means 420 may use resistance heating by a heating element, high-frequency induction heating, or the like. The temperature in the first furnace 410 can be kept constant by the first heating means 420. The second heating means 440 is provided to surround the second furnace 430 and serves to heat a raw material. The second heating means 440 serves to raise the internal temperature of the second furnace 430 to a target temperature (for example, 80 to 500° C.) and keep it constant. The second heating means 440 may use resistance heating by a heating element, high-frequency induction heating, or the like. The temperature in the second furnace 430 can be kept constant by the second heating means 440.

The second furnace 430 may be provided with a gas inlet (not shown) through which gas is introduced. A gas such as a carrier gas or air may be introduced into the second furnace 430 through the gas inlet.

The first furnace 410 may be provided with a gas outlet (not shown), and an exhaust device (not shown) such as a pump may be installed in the gas outlet, through which the gas remaining in the first furnace 410 after heat treatment may be discharged the an outside.

A cooling cylinder (not shown) may be provided around the first furnace 410 and the second furnace 430, and overheating of the inside of the furnace 310 can be suppressed and rapidly cooled by water-cooling with cooling water (CW) flowing inside the cooling cylinder. The cooling water is supplied to the cooling cylinder by connecting a cooling water inlet (CWI), the supplied cooling water is discharged through a cooling water outlet (CWO), and it is preferable to allow the cooling water to circulate through the cooling cylinder so that the chamber can be evenly cooled throughout.

The ceramic substrate 10 to be surface-modified is positioned in the first furnace 410. The raw material 20 for surface modification is put in the crucible 340 and positioned in the second furnace 430. The first furnace 410 and the second furnace 430 may have different heating temperatures. The crucible 340 is preferably made of a material having a high hardness and a high melting point such as alumina ($Al_2O_3$), graphite, carbon (carbon excluding graphite), tungsten or tantalum, and this is because in the case of using the crucible 340 made of a material with a low melting point, it may act as an impurity in a subsequent heat treatment process.

The ceramic substrate 10 is heated through the first heating means 420, the raw material 20 is heated through the second heating means 440, a carrier gas 350 flows through the second furnace 430 so that the vaporized raw material flows into the first furnace 410, and the vaporized raw material introduced into the first furnace 410 moves to the substrate 10 and adsorbed on the surface of the ceramic substrate 10, and thus the surface of the ceramic substrate 10 is modified. It is preferable to set a heating temperature for the ceramic substrate 10 and a heating temperature for the raw material 20 to be different from each other. For example, the ceramic substrate 10 is heated at 150 to 500° C., and the raw material 20 is heated at 100 to 450° C. It is preferable to set the temperature at which the raw material is heated lower than the temperature at which the ceramic substrate 10 is heated. The heating is performed for 10 minutes to 48 hours, more preferably 1 to 24 hours, and most preferably 2 to 12 hours. The carrier gas may be an inert gas such as argon (Ar) or helium (He) or an inert gas such as nitrogen ($N_2$) gas. The carrier gas is preferably supplied at a flow rate of 0.01 to 2.0 L/min, and more preferably 0.1 to 1.0 L/min. The carrier gas is supplied from one end of the second furnace 430 farthest from one end of the first furnace 410 and moved to the other end of the second furnace 430, and moves from the other end of the second furnace 430 to the other end of the first furnace 410 via one end of the first furnace 410. The vaporized raw material takes advantage of the flow of the carrier gas and moves to the side where the substrate is positioned.

The vaporized raw material moves to the ceramic substrate 10 to be surface-modified, and the $F^-$ anion penetrates into the ceramic substrate 10 to undergo surface modification on the surface of the ceramic substrate, and a surface-modified surface layer with a composition including one or more anions selected from the group consisting of $F^-$ and $Cl^-$ is formed on the surface of the ceramic substrate. The surface layer is a layer in which an oxide composition component constituting the bulk was modified to a composition including one or more anions selected from the group consisting of $F^-$ and $Cl^-$. The thickness of the surface-modified ceramic substrate (a combined thickness of the bulk and surface layers) is the same as the thickness of the ceramic substrate before surface modification, or becomes thicker due to volume expansion of the surface layer by a surface modification process.

Hereinafter, experimental examples according to the present invention will be presented in detail, and the present invention is not limited to the experimental examples presented below.

Experimental Example 1

A ceramic substrate to be surface-modified and a raw material for surface modification of the ceramic substrate were put in a crucible. As the ceramic substrate, a material made of yttria ($Y_2O_3$) was used. $NH_4F$ powder was used as the raw material. The ceramic substrate and the raw material were put in the crucible at a volume ratio of 1:1. The crucible was made of an alumina ($Al_2O_3$) material having high hardness and a high melting point. As the crucible, a crucible with a cover was used as shown in FIG. 3. The ceramic substrate was seated on a support that was higher than a bottom surface of the crucible and smaller than an inner diameter of the crucible. The ceramic substrate seated on the support was positioned higher than the raw material. The support was positioned on a lower surface of the crucible, the ceramic substrate to be surface-modified was positioned thereon, and a raw material ($NH_4F$ powder) containing highly reactive anions was placed on a bottom surface of the crucible.

The crucible accommodating the ceramic substrate and the raw material was charged into a chamber provided to adjust an internal temperature through a heating means. The chamber was made of a heat-resistant alumina ($Al_2O_3$) material, which is chemically stable and has a melting point higher than a heat treatment temperature. The chamber was sealed to prevent the inflow of external gas during surface modification.

A surface of the ceramic substrate was modified by heating the raw material through the heating means and adsorbing the vaporized raw material on the surface of the ceramic substrate. The heating (heat treatment) was performed at a temperature of 150° C. for 12 hours. It was confirmed that an $F^-$ anion penetrated into the ceramic substrate by the heat treatment, surface modification was performed on the surface of the ceramic substrate, and an $YO_xF_y$ surface layer was formed on the surface of the ceramic substrate. It could be confirmed that a thickness of the surface layer formed on the surface of the ceramic substrate (thickness to be surface-modified on the surface of the ceramic substrate) was about 8 to 8.5 μm, and looking at the anion composition of the surface layer, the modification was made with a composition in which an atomic content of fluorine (F) is four times higher than that of oxygen (O). When the surface modification time was 6 hours, the thickness of the surface layer was about 3 μm. Therefore, the thickness of the surface layer could be adjusted by controlling the surface modification time.

Figure 7:
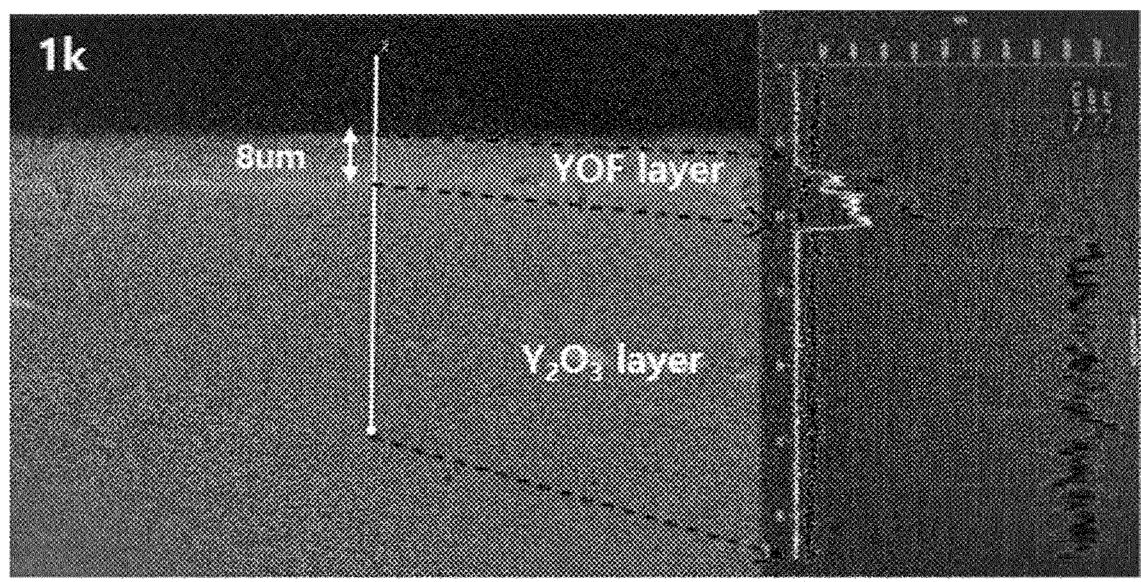
FIGS. 7 and 8 are scanning electron microscope (SEM) images showing cross-sections obtained by surface modification of an $Y_2O_3$ substrate according to Experimental Example 1.
Figure 8:
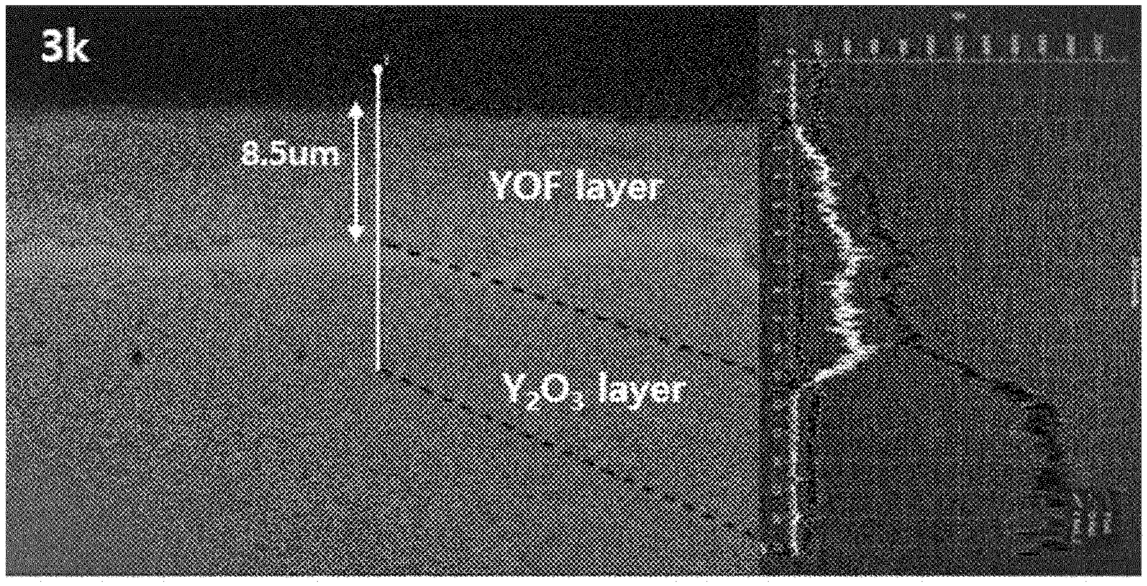

Table 1 below shows the elemental content of the bulk of an $Y_2O_3$ substrate, which is a ceramic substrate, and Table 2 below shows the elemental content of the surface layer of the $Y_2O_3$ substrate, which is the ceramic substrate, and FIGS. 7 and 8 are scanning electron microscope (SEM) images showing cross-sections obtained by surface modification of the $Y_2O_3$ substrate according to Experimental Example 1.

TABLE 1

| $Y_2O_3$ bulk-nternal | | |
|---|---|---|
| Element | wt % | Atomic % |
| Y | 84.73 | 49.97 |
| O | 15.27 | 50.03 |
| F | 0.00 | 0.00 |

TABLE 2

| YOF surface layer-after surface modification | | |
|---|---|---|
| Element | wt % | Atomic % |
| Y | 56.40 | 21.13 |
| O | 7.42 | 15.44 |
| F | 36.18 | 63.43 |

Experimental Example 2

A ceramic substrate to be surface-modified and a raw material for surface modification of the ceramic substrate were separated into separate spaces. The raw material was put in a crucible, the crucible accommodating the raw material and the ceramic substrate were each charged into a chamber, and the ceramic substrate and the raw material were spatially separated. The crucible accommodating the raw material was open, and the ceramic substrate was positioned outside the crucible. As the ceramic substrate, a material made of yttria ($Y_2O_3$) was used. $NH_4F$ powder was used as the raw material. The crucible was made of an alumina ($Al_2O_3$) material having high hardness and a high melting point. Meanwhile, the chamber including the ceramic substrate and the crucible was sealed, and a gas inlet through which gas flowed and a gas outlet through which gas was discharged were connected to the left and right sides of the chamber. A small amount of air, for example, 1 sccm, was flowed through the gas inlet.

The chamber provided to be able to adjust an internal temperature through a heating means was made of a heat-resistant alumina ($Al_2O_3$) material, which is chemically stable and had a melting point higher than a heat treatment temperature.

A surface of the ceramic substrate was modified by heating the raw material through the heating means and adsorbing the vaporized raw material on the surface of the ceramic substrate. The heating (heat treatment) was performed at a temperature of 150° C. for 12 hours. It was confirmed that an $F^-$ anion penetrated into the ceramic substrate by the heat treatment, surface modification was performed on the surface of the ceramic substrate, and an YOF surface layer was formed on the surface of the ceramic substrate. A thickness of the surface layer formed on the surface of the ceramic substrate (thickness to be surface-modified on the surface of the ceramic substrate) was about 3 nm to 7 am.

Figure 9:
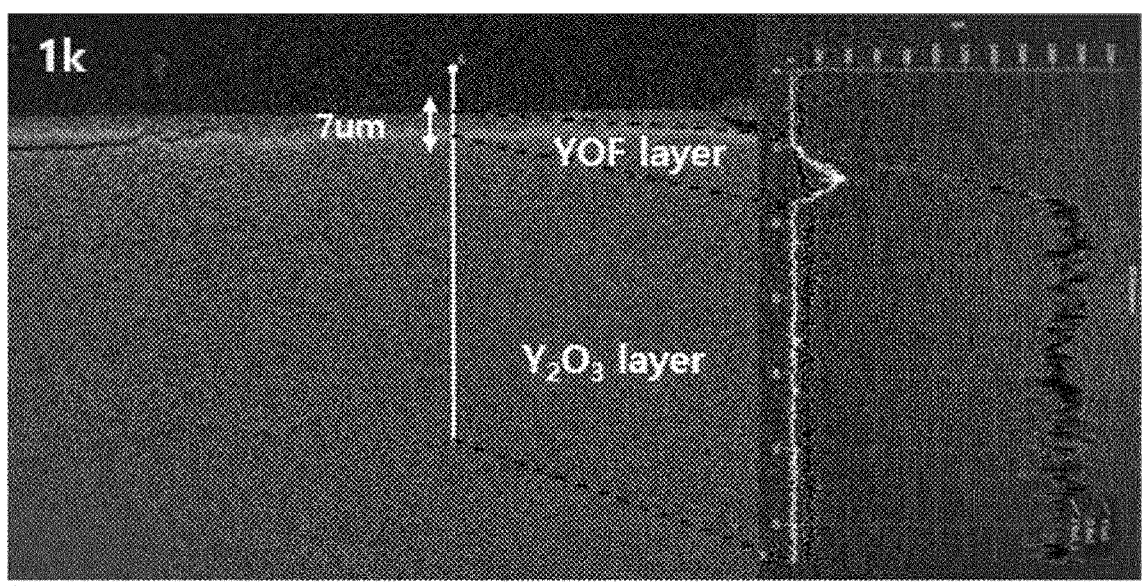
FIGS. 9 and 10 are SEM images showing cross-sections obtained by surface modification of an $Y_2O_3$ substrate according to Experimental Example 2.
Figure 10:
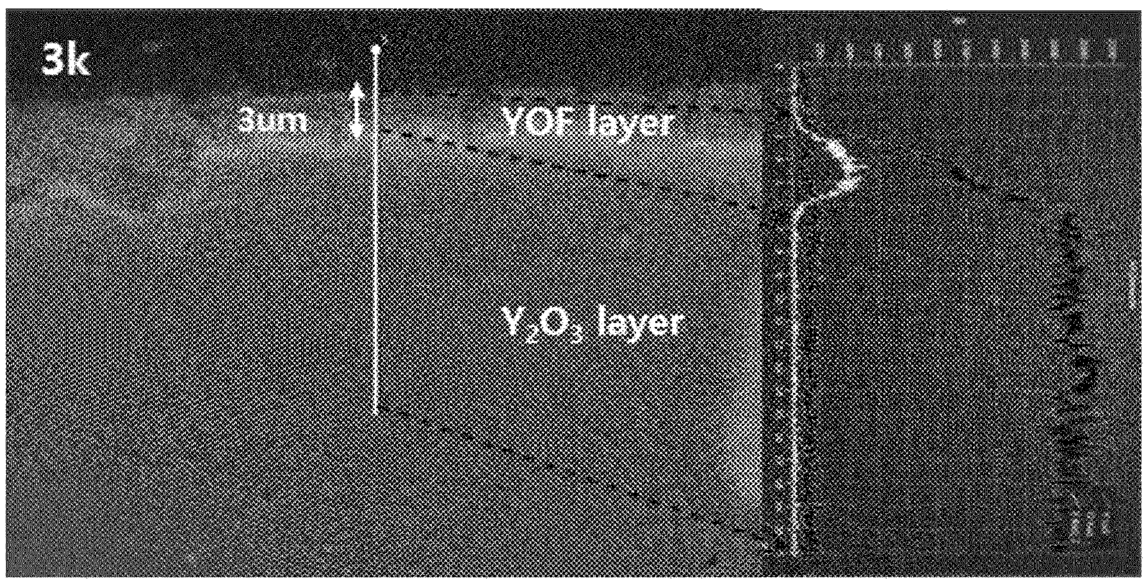

Table 3 below shows the elemental content of bulk of an $Y_2O_3$ substrate, which is a ceramic substrate, and Table 4 below shows the elemental content of the surface layer of the $Y_2O_3$ substrate, which is the ceramic substrate, and FIGS. 9 and 10 are scanning electron microscope (SEM) images showing cross-sections obtained by surface modification of the $Y_2O_3$ substrate according to Experimental Example 2.

TABLE 3

| $Y_2O_3$ bulk-internal | | |
|---|---|---|
| Element | wt % | Atomic % |
| Y | 82.74 | 46.36 |
| O | 17.07 | 53.15 |
| F | 0.19 | 0.17 |

TABLE 4

| YOF surface layer-after surface modification | | |
|---|---|---|
| Element | wt % | Atomic % |
| Y | 41.37 | 12.36 |
| O | 21.63 | 35.91 |
| F | 37.00 | 51.73 |

Referring to Tables 3 and 4, an atomic ratio of O and F in an anion was about 1:1.4, so that a surface layer with a higher content of oxygen (O) than Experimental Example 1 could be produced. It shows that a composition of the surface layer can be adjusted to a desired composition by controlling the amount of air flow. As mentioned above, although exemplary embodiments of the present invention have been described in detail, the present invention is not limited to the above examples, and various modifications are possible by those skilled in the art.

DESCRIPTION OF MARKS IN THE FIGURES

10: Ceramic substrate
**10*a***: Bulk
**10*b***: Surface layer
20: Raw material
100: Chamber
110: Crucible
120: Support
130: Cover

INDUSTRIAL APPLICABILITY

According to the present invention, plasma resistance and durability can be enhanced through surface modification of ceramic oxide parts used in semiconductor chip production process equipment (etching, CVD coating, and the like), and there is industrial applicability.

The invention claimed is:

1. A method of manufacturing a plasma-resistant ceramic substrate, the method comprising:

(a) heating and vaporizing a raw material containing one or more anions selected from the group consisting of $F^-$ and $Cl^-$; and (b) forming a surface layer by adsorbing the vaporized raw material on a surface of a ceramic substrate and by modifying the surface of the ceramic substrate, wherein the surface layer is a layer in which an oxide composition component constituting a bulk of the ceramic substrate was modified to a composition including one or more anions selected from the group consisting of $F^-$ and $Cl^-$.

2. The method of claim 1, wherein the bulk of the ceramic substrate is made of $Y_2O_3$, $Y_3Al_5O_{12}$, yttria-stabilized zirconia or a zirconia material doped with one or more elements selected from the group consisting of rare earth elements, Ca and Mg.

3. The method of claim 1, wherein the surface layer is formed to a thickness of 100 nm to 50 μm.

4. The method of claim 1, wherein the raw material includes one or more solid materials selected from the group consisting of $NH_4F$, $NH_5F_2$, LiF, NaF, KF, $MgF_2$, $CaF_2$, $AlF_3$, and $YF_3$.

5. The method of claim 1, wherein the raw material includes one or more solid materials selected from the group consisting of $NH_4Cl$, $YCl_3$, $AlCl_3$, and $TaCl_3$.

6. The method of claim 1, wherein the raw material is a solid material that is a mixture of one or more materials selected from the group consisting of $NH_4F$, $NH_5F_2$, LiF, NaF, KF, $MgF_2$, $CaF_2$, $AlF_3$, and $YF_3$ and one or more materials selected from the group consisting of $NH_4Cl$, $YCl_3$, $AlCl_3$, and $TaCl_3$.

7. The method of claim 1, wherein a non-reactive solid diluent is further mixed with the raw material and heated together with the raw material, and an amount of the raw material vaporized by heating is controlled by the non-reactive solid diluent.

8. The method of claim 1, wherein an inert carrier gas is introduced while the vaporized raw material moves to the ceramic substrate to control a concentration of the vaporized raw material or to control an atmosphere for surface modification.

9. The method of claim 1, wherein air or oxygen ($O_2$) gas is introduced to control an oxygen content of the surface layer to be modified while the vaporized raw material moves to the ceramic substrate.

10. The method of claim 1, wherein the ceramic substrate to be surface-modified, and the raw material containing one or more anions selected from the group consisting of $F^-$ and $Cl^-$ are heated, and the surface of the ceramic substrate is modified to the composition including one or more anions selected from the group consisting of $F^-$ and $Cl^-$ while the raw material vaporized by heating is adsorbed on a surface of the heated ceramic substrate.

11. The method of claim 1, wherein the raw material is heated to a temperature of 80 to 500° C., and vaporized and adsorbed on the surface of the ceramic substrate.

12. The method of claim 1, wherein step (a) comprises:

(c) putting the ceramic substrate to be surface-modified and the raw material containing one or more anions selected from the group consisting of $F^-$ and $Cl^-$ into a crucible;

(d) charging the crucible accommodating the ceramic substrate and the raw material into a chamber provided to control an internal temperature through a heating means; and (e) heating and vaporizing the raw material through the heating means.

13. The method of claim 12, wherein in step (c), the ceramic substrate and the raw material are put in the crucible so as to be positioned in spaces separated from each other.

14. The method of claim 13, wherein the ceramic substrate is positioned higher than the raw material.

15. The method of claim 13, wherein a support higher than a bottom surface of the crucible and smaller than an inner diameter of the crucible is provided in the crucible, the raw material is positioned on the bottom surface of the crucible, and the ceramic substrate is seated on the support to be positioned higher than the raw material so that the raw material and the ceramic substrate are spatially separated.

* * * * *